United States Patent [19]
Lanzer

[11] Patent Number: 5,791,223
[45] Date of Patent: Aug. 11, 1998

[54] ANGLED POWER SAW FOR RAILROAD RAILS

[75] Inventor: Delmar A. Lanzer, Woodburn, Ind.

[73] Assignee: Midwest Rail Inc., Fort Wayne, Ind.

[21] Appl. No.: 823,827

[22] Filed: Mar. 25, 1997

Related U.S. Application Data

[63] Continuation of Ser. No. 501,857, Jul. 13, 1995, abandoned.

[51] Int. Cl.$^6$ .................................................. B23D 45/14
[52] U.S. Cl. ............................ 83/471.3; 83/490; 83/527
[58] Field of Search ........................ 83/625, 490, 471.3, 83/486.1, 581, 473, 527

[56] References Cited

U.S. PATENT DOCUMENTS

| | | | |
|---|---|---|---|
| 1,746,594 | 2/1930 | Jacobson | 83/471.3 |
| 2,007,563 | 7/1935 | De Koning | 83/486.1 |
| 2,382,971 | 8/1945 | Brocco et al. | 83/486.1 |
| 2,590,119 | 3/1952 | Osterhus | 83/486.1 |
| 2,996,088 | 8/1961 | Hensley | 143/46 |
| 3,069,950 | 12/1962 | Hensley | 83/168 |
| 3,092,154 | 6/1963 | Dobslaw | 83/486.1 |
| 3,163,069 | 12/1964 | Edmon | 83/303 |
| 3,302,669 | 2/1967 | Edler | 83/486.1 |
| 3,540,338 | 11/1970 | McEwan | 83/490 |
| 3,686,990 | 8/1972 | Margolien | 83/489 |
| 3,759,124 | 9/1973 | Bashor | 83/490 |
| 4,031,788 | 6/1977 | Boge et al. | 83/490 |
| 4,262,564 | 4/1981 | Kaltenbach | 83/490 |
| 4,318,324 | 3/1982 | Hall et al. | 83/490 |
| 4,335,637 | 6/1982 | Kaltenbach | 83/490 |
| 4,364,311 | 12/1982 | Platt, III | 100/6 |
| 4,531,440 | 7/1985 | Lucky | 83/490 |
| 4,574,670 | 3/1986 | Johnson | 83/409 |
| 4,873,902 | 10/1989 | Krieg | 83/745 |
| 5,086,678 | 2/1992 | Aoyagi | 83/13 |
| 5,179,886 | 1/1993 | Rathje, Jr. | 83/486.1 |

*Primary Examiner*—Kenneth E. Peterson
*Attorney, Agent, or Firm*—Baker & Daniels

[57] ABSTRACT

The present invention involves a power saw for cutting railroad rails at an angle. The power saw includes a base, a cutting location disposed proximate the base, a cutting disc and associated driving mechanism, and a device for moving the cutting disc and changing the angle of the cutting disc relative to the cutting location. A table supports the cutting disc and driving mechanism, and the base has two pivots selectively engageable with the table. The driving mechanism of the cutting disc includes a cam based oscillating device for oscillating the cutting disc during cutting of a railroad rail. The power saw also includes a guide and a conveyor system for positioning a railroad rail on the cutting location. The conveyor system moves railroad rails to the guide. A device for applying force against the direction of the cutting force of the cutting disc is located at the cutting location. A device for delivering a fluid, a coolant, lubricant, or rust-inhibiting solution, is located adjacent to the cutting disc. A device for aligning the cutting disc with the cutting location maintains the low point of the cutting disc in alignment with the cutting location. The resulting joint for a railroad rail comprises a pair of rails having matching ends disposed at an angle in the range of about: 50° and 30°, a dielectric material disposed between the ends, and a bar attached to and connecting the rails.

6 Claims, 3 Drawing Sheets

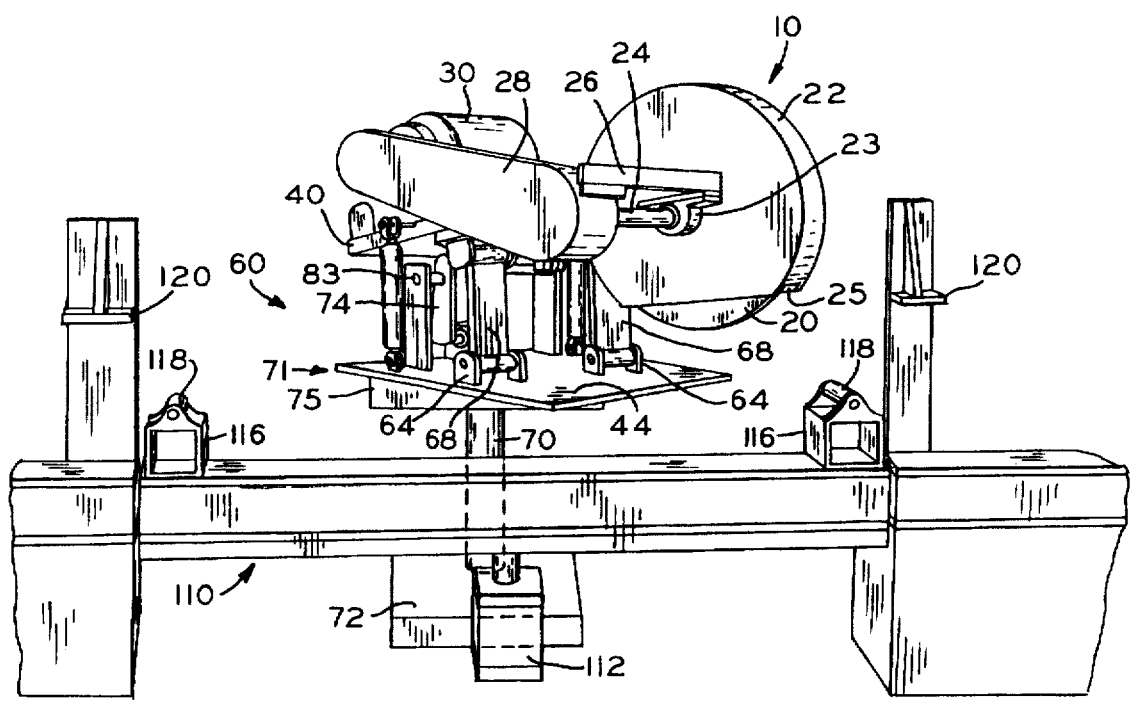
FIG_1
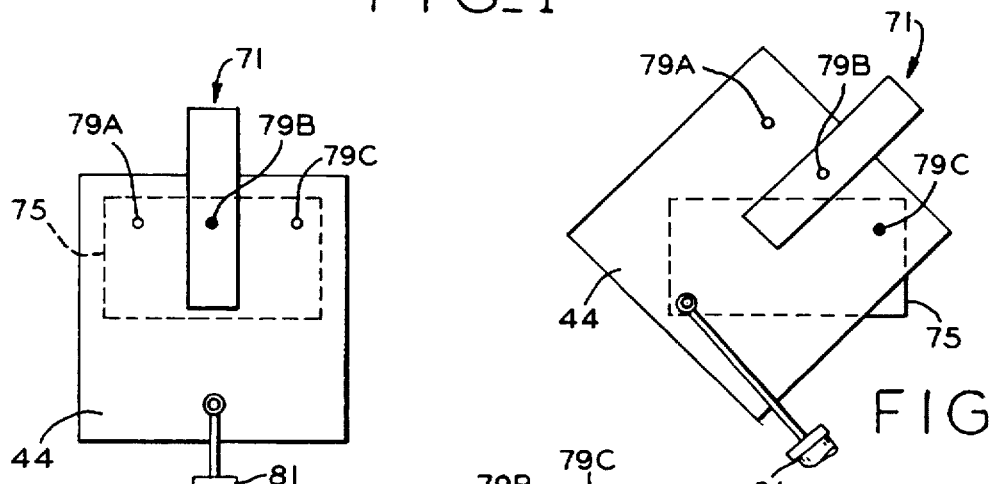
FIG_2
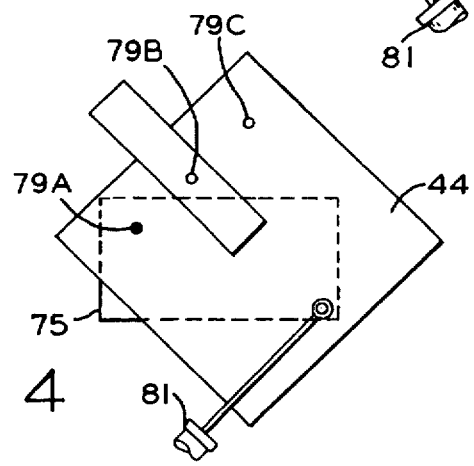
FIG_3
FIG_4

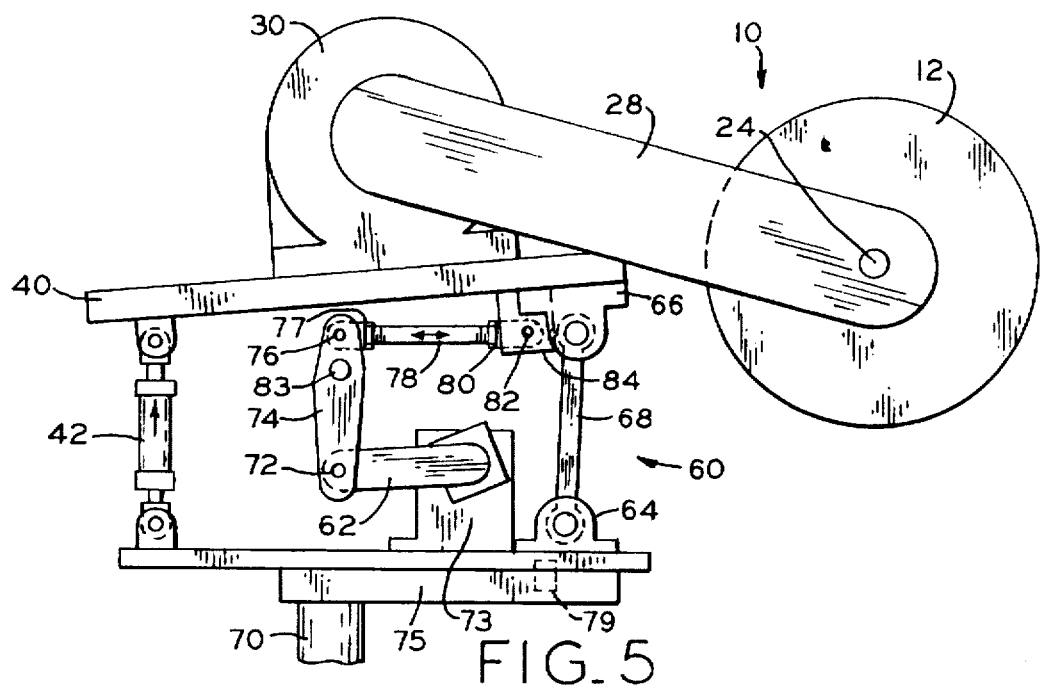
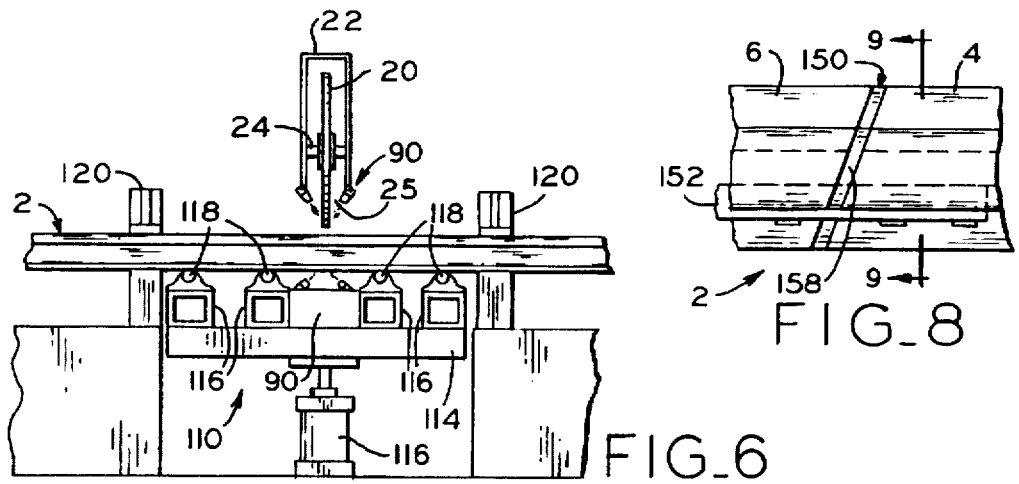
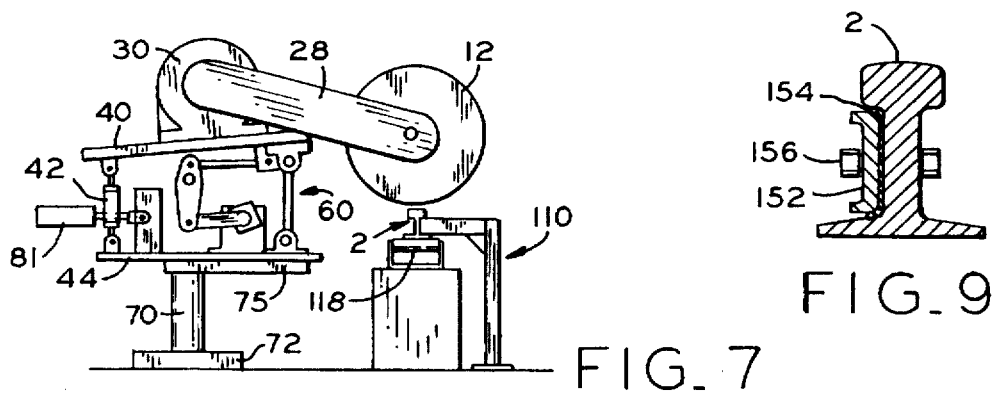

ANGLED POWER SAW FOR RAILROAD RAILS

This is a continuation of application Ser. No. 08/501,857, filed Jul. 13, 1995, now abandoned.

BACKGROUND OF THE INVENTION

1. Field of the Invention

The present invention involves joints for railroad rails. More particularly, the present invention relates to power saws for cutting railroad rails for making railroad joints.

2. Description of the Related Art

Conventionally, railroad rail joints are made by adhering two straight cut rail pieces. One known method of cutting railroad rails involves using an instrument providing an oxy-fuel flame, such as produced by acetylene, natural gas, or other fuel and oxygen mixtures. Unfortunately, cutting with an oxy-fuel system has many undesirable side effects, namely: heat distortion of the rail; poor accuracy of the cut; poor quality of the cut; inability to weld the rail; and the requirement than the end of the cut be ground off before further attachment. These negative effects make oxy-fuel cutting instruments undesirable for many applications.

Another known method of cutting railroad rails involves using an abrasive power saw with a silicon carbide grinding disc. The grinding disc is applied to the rail perpendicular to the axis of the rail to create a 90° cut. A relatively high horsepower motor, e.g. 75 horsepower, drives the grinding disc and is securely located on the floor so that the grinding disc is accurately positioned against the high resistance of the rail to cutting. Typically, the rails are considerably longer than the power saw, e.g. eighty feet, requiring that a conveyor system be installed adjacent to the power saw. This type of cutting creates a relatively smooth surface at the end of the rail, and facilitates the incorporation of two ends of rails into a new rail joint.

Insulated rail joints are conventionally made by connecting the ends of two cut rails in an arrangement which electrically isolates the connected rail portions. A dielectric padding is placed in the gap between the ends of the rails to prevent direct conduction between the rail portions. A steel reinforcing bar or brace is attached to each rail portion to securely join them together. The steel reinforcing bar includes a dielectric barrier which is glued and cured on the surface of each bar which contacts a rail. Each rail end also has a series of holes near its abutting end, and dielectric sleeves are disposed in the holes so that metal bolts may be used to connect the bar with the rail portion. Finally, an adhesive is applied and cured before the bolts are tightened so that the dielectric barriers between the rail portions are securely disposed between the conductive portions of each rail.

A drawback of the above-described connection of straight cut rails is that the gap between the straight cuts of two joined rails creates a gap in the rail which does not support the trains. Although the dielectric material in the gap prevents electrical conduction between the rail ends, that material is not as physically durable as the hard steel of the rail. Also, the thermal expansion and contraction of rail segments, which are often miles long, requires that the joint be made structurally secure to withstand the resulting forces. Consequently, the gap presents an interruption between the contiguous rails which guide the train and creates a "bump" during the traversal of the train.

The rail material adjacent each gap may be rolled over by the force of the trains traversing over the tracks, and the rolled material eventually electrically connects and thereby shorts out the switching signals conventionally transmitted over the rail line. The problem of rolled over rail ends can be temporality solved by grinding out the rolled over material bridging the gap, but using that type of correction further deteriorates the joint.

One known attempt to avoid the problems inherent in the gap between rail portions utilizes a 45° cut of the rail. With this method, the gap between the rail ends is bridged by the angled portions created by the cut. While initially this design is effective in eliminating the "bump" created by the gap, this design may not be reliable over time. Trains apply such a large load on the rail that the relatively thin angled ends may shear off, leaving an even greater gap than the joints with a 90° cut. Notwithstanding the potential difficulties with the 45° joint, manufacturing such a joint with conventional power saws requires: that the rail be placed at a 45° angle relative to the grinding disc. This arrangement is difficult to accomplish, and the relative orientation may drift over repeated cuttings.

What is needed in the art is an improved power saw for railroad rails, and specifically, a power saw for cutting railroad rails at an angle.

Also needed is an improved joint for railroad rails.

SUMMARY OF THE INVENTION

The present invention is a power saw capable of angled cutting of railroad rails, and an improved angle-cut rail joint: which may be manufactured by the inventive power saw. The power saw includes a pivoting arrangement allowing for the cutting angle to bisect the rail without disturbing the integrity of the cut. An alignment mechanism of the power saw orients the grinding disc at the center of the rail being cut regardless of the angle of the cut. The improved angle-cut rail joint utilizes the inventive power saw to cut an angle from 0° to 45°, or more particularly at a 5° to 30° angle, from a plane perpendicular to the axis of the rail so that the joint bridges the gap between rail ends without excessively weakening the distal end of the angled cut rail end.

While an ordinary piece of material can be held at an angle for the saw, rails typically range from 40 to 80 feet long and cannot be manipulated like a smaller piece. Therefore, the cutting angle must be created not by manipulation of the position of the rail to be cut, but rather by the position of the saw blade relative to the fixed position of the rail. In addition, the mechanism positioning the grinding disc must be well anchored so that the disc may be driven into the rail with the needed force. The invention involves the addition of features to a power saw which enables the saw to cut through railroad rails at a variable angle.

The power saw of the present invention includes a dual pivot point mechanism which allows for aligning the center of the cutting blade approximately over the center of the rail regardless of the cutting angle. The power saw also includes an oscillating mechanism with an adjustable stroke for slightly varying the location of the cutting action to lessen the power needed and to reduce the heat produced during cutting. Also, the power saw includes a hydraulic lift that exerts an upward bias beneath the cutting blade to prevent the blade from being trapped on account of the downward pressure of the blade on the rail.

In addition to the cutting mechanism itself, the power saw has other advantageous features. The rail is clamped by a mechanism connected to a conveyor system so that the saw mechanism is not effected by the movement of the rails. The saw is also equipped with a cooling system for delivering water and a lubricant, e.g., a soluble oil, to the site of the cut to minimize thermal damage. A rust-inhibiting solution is also delivered to the cutting site to reduce the oxidation of the rails.

The present invention, in one form, is a power saw for cutting a railroad rail. The power saw includes a base, a cutting disc, and an associated driving mechanism. The base defines a cutting location while the cutting disc and associated driving mechanism are capable of cutting a railroad rail. The power saw also includes a mechanism for moving the cutting disc and changing the angle of the cutting disc and the cutting location.

An advantage of the present invention is that it can cut a railroad rail at an angle by pivoting the cutting mechanism relative to the position of the railroad rail to be cut.

Another advantage is that the cutting mechanism oscillates as it contacts and cuts the railroad rail, reducing the heat created during cutting. Provision of water and a lubricant to the cutting site during cutting further reduces heat and stress to the rail during cutting.

Yet another advantage is that railroad rails cut at an angle and joined reduce the bump experienced by trains upon traversing rail joints.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a perspective view of the power saw of the present invention.

FIG. 2 is a top plan view, in schematic form, of the power saw of the present invention.

FIG. 3 is a top plan view, in schematic form, of the power saw of the present invention pivoted on one of its pivot points.

FIG. 4 is a top plan view, in schematic form, of the power saw of the present invention pivoted on the other of its pivot points.

FIG. 5 is a side view, in schematic form, of the power saw of the present invention.

FIG. 6 is a front view of the grinding disc and cutting location of the power saw.

FIG. 7 is a side view of the power saw, conveyor system, and guide rail.

FIG. 8 is a top view of the angled rail joint of the present invention.

FIG. 9 is a side, sectional view taken along view line 9—9 of FIG. 8.

Figure 10:
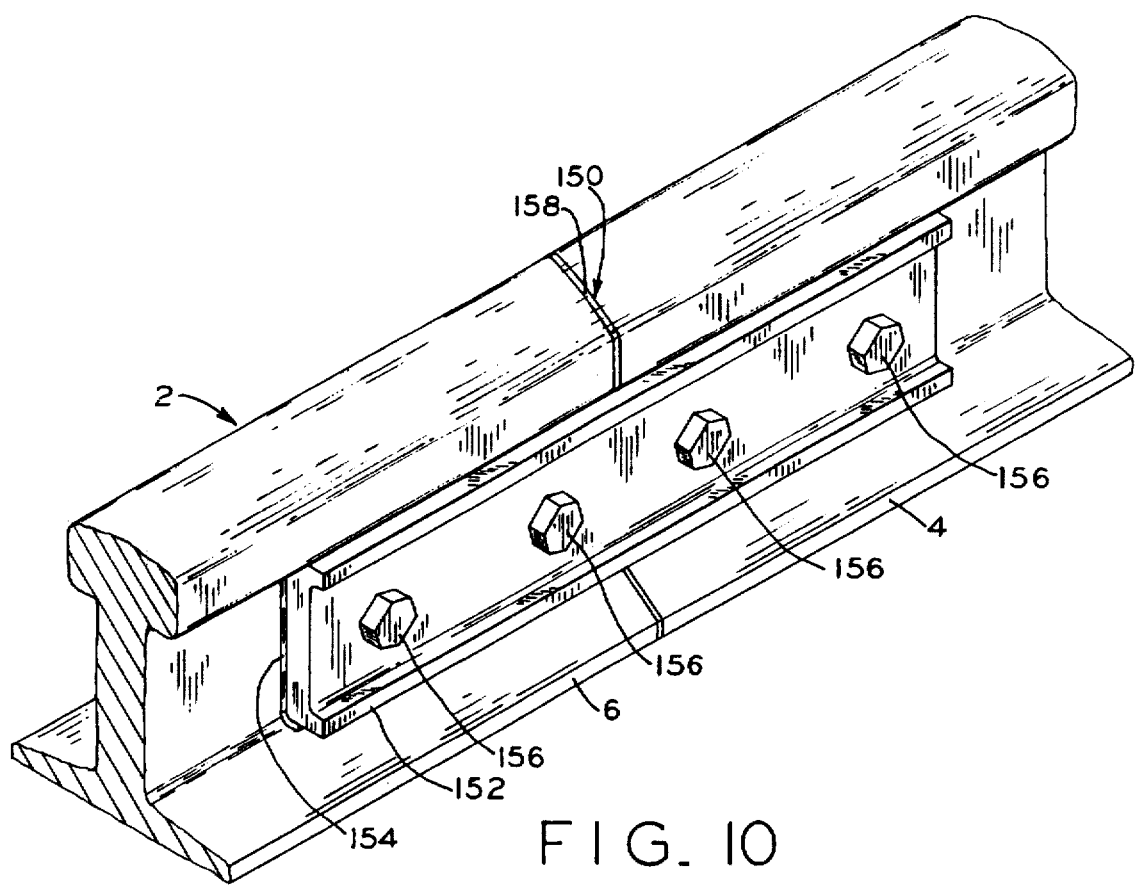
FIG. 10 is a perspective view of the railroad joint of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates one preferred embodiment of the invention, in one form, and such exemplifications are not to be construed as limiting the scope of the invention in any manner.

DESCRIPTION OF THE EXEMPLARY EMBODIMENTS

The exemplary embodiment disclosed below is not intended to be exhaustive or limit the invention to the precise form disclosed in the following detailed description. Rather, the embodiment is chosen and described so that others skilled in the art may utilize its teachings.

In accordance with the present invention, an angled power saw for railroad rails includes cutting mechanism 10 (FIG. 5), pivoting arrangement 71 (FIG. 1), oscillating mechanism 60 (FIG. 6), hydraulic lift 112 (FIG. 1), conveyor system 110 (FIG. 1), and cooling system 90 (FIG. 6). The various motors and hydraulic cylinders of the power saw and conveyor system may be operated manually or with an electronic or microprocessor based control system. While the remainder of the specification describes the invention in terms of a manual control, the provision of an electronic or microprocessor control is contemplated with the present invention.

Cutting mechanism 10 (FIGS. 1 and 5) includes platform 40 upon which is fixedly mounted saw motor 30, which powers cutting mechanism 10. Saw motor 30 is a relatively high horsepower motor, e.g. 75 horsepower. Arm 28 is pivotally coupled at one end thereof to saw motor 30. At another end thereof, arm 28 is attached to support 26 at one end thereof. At a second end thereof, support 26 includes sleeve 23 fixedly joined to disc housing 22. Grinding or cutting disc 20 is disposed within disc housing 22 and rotates about rod 24. Rod 24 is rotatably attached at one end thereof to arm 28, and at another end thereof passes through sleeve 23 and into disc housing 22 to rotatably connect with grinding disc 20. Power is provided from saw motor 30 to grinding disc 20 via rod 24. Grinding disc 20 is disposed within disc housing 22 and rotates about rod 24. A portion of grinding disc 20 protrudes from opening 25 in disc housing 22 in order to contact rail 2. Cooling system 90 (FIG. 6) is connected to opening 25 and provides coolant and a rust-inhibiting solution at the site at which grinding disc 20 contacts rail 2. Cooling system 90 is also mounted on beam 114 to provide coolant and a rust-inhibiting solution to the cutting site from below grinding disc 20. Cooling system 90 comprises one or more fluid lines for conveying a coolant to the cutting site, with the fluid lines terminating in nozzles or other suitable arrangements to direct the coolant to the rail being cut. The coolant may include water, a lubricant, or other suitable fluids.

Pivoting arrangement 71 includes base 44 (FIGS. 1, 2, 3, 4, 5, and 7) pivotally mounted on support 75 via one of three pins 79A, 79B, or 79C (FIGS. 2, 3, 4, and 5). Base 44 may be supported on support 75 with rollers, bearings, lubricated contacting surfaces, or any combination or functional equivalent creating a movable connection. The interface between base 44 and support 75 preferably includes shielding to prevent the penetration of moisture or abrasive materials into the interstices between the contacting surfaces.

Selection of one of pins 79A, 79B, or 79C determines the pivotal orientation of base 44 relative to support 75. After activation of one of pins 79A, 79B, or 79C to determine the pivotal orientation of base 44 relative to support 75, hydraulic cylinder 81 actuates to pivot base 44 about selected pin 79A, 79B, or 79C, then secures base 44 in the selected pivotal position relative to support 75. Three possible alternative positions of base 44 relative to support 75 are shown in FIGS. 2, 3, and 4, although any angle from 0° to 45° degrees in either direction may be selected. Support leg 70 is rigidly secured to support 75, and to the floor.

Oscillating mechanism 60 is mounted on base 44 and includes support member 68 disposed between block 64, fixedly mounted to base 44, and block 66, fixedly mounted to platform 40. Oscillating mechanism 60 also includes arm 63 pivotally joined at one end thereof to cammed motor 73 and pivotally connected to one end of joint 72. Arm 74 is pivotally mounted on rod 83. At another end thereof, rod 72 is pivotally attached to one end of arm 74. At the other end thereof, arm 74 is pivotally attached by joint 76 to yoke 77 at one end of shaft 78. Yoke 80 at another end of shaft 76 is attached by bolt 82 to anchor 84. Upon activation, cammed motor 73 displaces arm 62, which pivots about joint 72, which in turns displaces arm 74. Arm 74 pivots about rod 83, which in turn pivots shaft 78 about joint 76. Shaft 78 thus displaces yoke 80, providing an oscillating motion to platform 40.

Hydraulic cylinder 42 (FIGS. 1, 5, and 7) is disposed between platform 40 and base 44 to pivot cutting mechanism 10 on support member 68 and to apply downward pressure and cutting force on rail 2. Also, arm 28 is pivotally mounted over the plane of platform 40 at a location which results in arm 28 angling downward. Arm 28 and the height of support member 68 is arranged so that as grinding disc 20 cuts through rail 2, the pivoting movement of arm 28 does not substantially effect the cutting location of grinding disc 20. This arrangement results in the lower most point of grinding disc 20 being maintained at about the same position relative to the rail being cut. Thus during cutting of the rail, the full force of the cutting mechanism is applied downward on the cutting surface rather than having only a component of the full force being applied at an angle to rail 2. While the cutting is occurring, oscillating mechanism 60 varies the exact location of the lowest most point of grinding disc 20 relative to a horizontal plane through rail 2 so that the heat of the cutting action is distributed. The oscillation motion, in conjunction with the operation of hydraulic cylinder 42 and the pivoting of platform 40 on support member 68, provides proper alignment of grinding disc 20 during the cutting of rail 2.

Conveyor system 110 (FIGS. 1 and 6) includes hydraulic lift 112 upon which is mounted beam 114. Blocks 116 are mounted upon beam 114 and include rollers 118. Rail 2 rolls over rollers 118 as it is conveyed through conveyor system 110 for cutting. When rail 2 is correctly positioned for cutting, it is firmly held between clamps 120 and rollers 118, hydraulic lift 112 exerting an upward force to counter the downward cutting force of grinding disc 20 as it is brought into cutting contact with rail 2.

To cut a rail 2 at an angle, the rail 2 to be cut is first conveyed along conveyor system 110 until rail 2 is positioned so that grinding disc 20 will contact rail 2 at the desired cutting location. Rail 2 is clamped between clamps 120 and rollers 118, while hydraulic lift or pusher 112 exerts an upward force on rail 2. One of pins 79A, 79B, or 79C is selected to determine the orientation of base 44 relative to support 75. After activation of one of pins 79A, 79B, or 79C to determine the pivotal orientation of base 44 relative to support 75, hydraulic cylinder 81 pivots base 44 through a controlled angle about selected pin 79A, 79B, or 79C, then secures base 44 in the selected pivotal position relative to support 75 to achieve the desired cutting angle at which grinding disc 20 will engage rail 2. Saw motor 30 powers grinding disc 20 with sufficient power to cut through rail 2. Fluid is supplied within hydraulic cylinder 42, thereby pivoting platform 40 and cutting mechanism 10 downward so that grinding disc 20 contacts rail 2. Oscillating mechanism 60, powered by the cammed motor 73, allows cutting mechanism 10 to oscillate as grinding disc 20 contacts rail 2. When grinding disc 20 contacts rail 2, cooling system 90 provides water, a lubricant, and a rust-inhibiting solution to the cutting site.

Referring to FIGS. 8 and 9, the cut 150 resulting from the inventive power saw described above is at an angle in the range of about 5° to 30°, more particularly in the range of about 15° to 25°, or preferably about 20°, from a plane perpendicular to the axis of rail 2. The resulting joint 150 includes bar 152 connecting rail end 4 and rail end 6 of rail 2, dielectric material 154 on bar 152 and glued to rail 2, and bolt 156 with an insulating sleeve securing rail ends 4 and 6 together. This arrangement traps dielectric pad 158, which has a cross-sectional area matching the faces of rail ends 4 and 6 between their facing surfaces. The general construction of rail joints is well known in this field, and the rail joint of the present invention is advantageous in the angle of the cut relative to the axis of the rail realized between two adjoining rails. With the present invention, a train traversing over joint 150 would experience less of a "bump" from the interrupted hard steel rail surface because of the overlapping portions of the rail ends. Also, the angle of the cut minimizes the size of the extending end of the rail thereby creating a cut rail end which is capable of withstanding the large load of a train.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A power saw for cutting a railroad rail, said power saw comprising:

a support having a pivot and a generally planar support surface;

a cutting location disposed proximate said support;

cutting means for cutting a railroad rail, said cutting means including a disc defining a cutting plane and a lower most cutting point, said disc supported by a base rotatably mounted on said planar support surface, said disc being fixed to an arm of said base so that said cutting plane has a fixed orientation relative to said base, said arm extending beyond said base and locating said disc proximate to said cutting location;

said base and said support surface having at least two sets of matching apertures, each said set being capable of receiving a selectively movable pivot, a first set of matching apertures spaced from the cutting plane of said disc; and means for moving said cutting means by rotating said base on said support surface about said pivot and changing the angle of said cutting plane of said disc relative to said cutting location through an angular range, said pivot in said first set of matching apertures engaging said base at a position of said base which is offset from the cutting plane of said disc so that said lower most cutting point is located approximately over said cutting location and the rail being cut throughout the angular range.

2. The power saw of claim 1 further comprising means for aligning said cutting means with said cutting location.

3. The power saw of claim 2 wherein said aligning means comprises a platform supporting said cutting means, said platform is connected to said base by a first pivotal connection and a second pivotal connection, said first pivotal connection has a fixed length, said second pivotal connection has means for varying the length of said second pivotal connection, and said power saw further comprises means for actuating said varying means to bias said lower most cutting point of said cutting disc at said cutting location through a cutting arc determined by said first pivotal connection.

4. A power saw for cutting a railroad rail, said power saw comprising:

- a support having a generally planar support surface;
- a clamp for holding a railroad rail in a cutting location, said clamp disposed proximate said support;
- a cutting disc and associated driving mechanism capable of cutting a railroad rail, said cutting disc and driving mechanism mounted on a base, said cutting disc defining a cutting plane and a lower most cutting point, said base rotatably mounted on said planar support surface, said disc being fixed to an arm of said base so that said cutting plane has a fixed orientation relative to said base, said arm extending beyond said base and locating said disc proximate to said cutting location; and
- a pivotal connection including a selectively movable pivot and at least two sets of matching apertures located in said base and said support surface, said pivotal connection located between said support and said base wherein said base is capable of moving said cutting disc and changing the angle of the cutting plane of said cutting disc relative to said cutting location through an angular range, said pivot of said pivotal connection engaging one of said sets of matching apertures that are located at a position which is offset from the cutting plane of said cutting disc so that said lower most cutting point is located approximately over said cutting location and the rail being cut throughout the angular range.

5. The power saw of claim 4 further comprising an alignment mechanism operably associated with said cutting disc to align said cutting disc with said cutting location.

6. The power saw of claim 5 wherein said aligning mechanism comprises a platform supporting said cutting disc, said platform is connected to said base by a first pivotal connection and a second pivotal connection, said first pivotal connection has a fixed length, said second pivotal connection includes a hydraulic cylinder capable of varying the length of said second pivotal connection to bias said lower most cutting point of said cutting disc at said cutting location through a cutting arc determined by said first pivotal connection.

* * * * *

UNITED STATES PATENT AND TRADEMARK OFFICE
CERTIFICATE OF CORRECTION

PATENT NO. : 5,791,223
DATED : August 11, 1998
INVENTOR(S) : Delmar A. Lanzer

It is certified that error appears in the above-identified patent and that said Letters Patent is hereby corrected as shown below:

In the Abstract, line 22 delete "50°" and insert --5°--.
Insert the following claims:
-- 7. The power saw of Claim 1 wherein said cutting means includes means for oscillating said cutting disc during cutting of a railroad rail.
8. The power saw of Claim 7 further comprising a platform supporting said cutting means and a motor operatively connected to said platform, and said motor including a cam for oscillating said platform.
9. The power saw of Claim 1 further comprising a guide and a conveyor system, said guide and said conveyor system mounted separately from said support, said guide adapted to position a railroad rail on said cutting location, and said conveyor system adapted to move a railroad rail to said guide.
10. The power saw of Claim 9 wherein said cutting location includes means for applying force against the direction of the cutting force of said cutting means.
11. The power saw of Claim 1 further comprising means for delivering a fluid at a location adjacent to said cutting means.
12. The power saw of Claim 11 wherein said delivering means delivers at least one of a coolant, lubricant, and rust-inhibiting solution.
13. The power saw of Claim 4 wherein said cutting disc is mounted on a pivotal platform capable of oscillating relative to said cutting location during cutting of a railroad rail.
14. The power saw of Claim 13 further comprising a motor operatively connected to said platform, and said motor including a cam for oscillating said platform.

UNITED STATES PATENT AND TRADEMARK OFFICE
CERTIFICATE OF CORRECTION

PATENT NO. : 5,791,223
DATED : August 11, 1998
INVENTOR(S) : Delmar A. Lanzer

It is certified that error appears in the above-identified patent and that said Letters Patent is hereby corrected as shown below:

15. The power saw of Claim 11 further comprising a guide and a conveyor system, said guide and said conveyor system mounted separately from said support, said guide adapted to position a railroad rail on said cutting location, and said conveyor system adapted to move a railroad rail to said guide.

16 The power saw of Claim 15 wherein said cutting location includes a pusher capable of applying force against the direction of the cutting force of said cutting disc.

17. The power saw of Claim 11 further comprising a fluid line terminating proximate a location adjacent to said cutting disc.

18. The power saw of Claim 17 wherein said fluid line delivers at least one of a coolant, lubricant, and rust-inhibiting solution.--

Signed and Sealed this

Fourth Day of May, 1999

Attest:

Q. TODD DICKINSON

*Attesting Officer*    Acting Commissioner of Patents and Trademarks